United States Patent [19]

Hayashi

[11] Patent Number: 5,796,491
[45] Date of Patent: Aug. 18, 1998

[54] COLOR IMAGE-FORMING MACHINE WHICH SELECTS DIFFERENT MASKING OPERATIONS BASED UPON DIFFERENT COLOR REGIONS

[75] Inventor: Syuji Hayashi, Osaka, Japan

[73] Assignee: Mita Industrial Co., Ltd., Osaka, Japan

[21] Appl. No.: 715,000

[22] Filed: Sep. 17, 1996

[30] Foreign Application Priority Data

Oct. 18, 1995 [JP] Japan ................ 7-269618

[51] Int. Cl.$^6$ .................. H04N 1/40; H04N 1/46; G06K 9/36; G06K 9/80
[52] U.S. Cl. .................. 358/298; 358/530; 358/538; 382/164; 382/283
[58] Field of Search ................ 358/296, 298, 358/501, 504, 505, 518–523, 530, 534, 538; 382/162, 164, 165, 167, 254, 276, 282, 283

[56] References Cited

U.S. PATENT DOCUMENTS 5,162,860  11/1992  Nami et al. ................ 358/501
5,594,558  1/1997  Usami et al. ................ 358/518

FOREIGN PATENT DOCUMENTS 64-7855   1/1989  Japan .
6-113126  4/1994  Japan .

*Primary Examiner*—Eric Frahm
*Attorney, Agent, or Firm*—Beveridge, DeGrandi, Weilacher & Young, LLP

[57] ABSTRACT

A color image-forming machine 08/715 000 includes a color image signal-forming device for outputting digital signals Cd, Md and Yd expressing, on tone levels, the three primary colors C, M and Y for a number of pixels, and a masking device for correcting the digital signals Cd, Md and Yd in compliance with masking operation expressions. A color region discrimination device is provided to discriminate, based on the digital signals Cd, Md and Yd, to which one of a plurality of predetermined color regions each of a number of pixels belong. The masking device corrects the digital signals Cd, Md and Yd by selecting different masking operation expressions depending upon each of the plurality of color regions.

3 Claims, 1 Drawing Sheet

COLOR IMAGE-FORMING MACHINE WHICH SELECTS DIFFERENT MASKING OPERATIONS BASED UPON DIFFERENT COLOR REGIONS

FIELD OF THE INVENTION

The present invention relates to a color image-forming machine such as color copying machine or color printer. More specifically, the invention relates to a color image-forming machine equipped with a masking means which corrects, in compliance with masking operation expressions, the digital signals Cd, Md, Yd expressing, on tone levels, three primary colors of C (which means "cyan" in this specification), M (which means "magenta" in this specification) and Y (which means "yellow" in this specification) in order to improve color reproduceability.

DESCRIPTION OF THE PRIOR ART

As is well known, a color copying machine which is a typical example of the color image-forming machine is equipped with a color image signal-forming means which includes a color image reading means and a conversion means. The color image reading means decomposes light reflected by each of a number of pixels on a document having color image into three primary colors R (which means "red" in this specification), G (which means "green" in this specification) and B (which means "blue" in this specification) in order to form analog signals Ra, Ga and Ba. The conversion means converts such analog signals Ra, Ga and Ba into digital signals Cd, Md and Yd that express, on tone levels, the three primary colors C, M and Y. The three primary colors C, M and Y have a complementary color relationship to the R, G and B, respectively. When expressed in 8-bit data on tone levels, i.e., on 0 to 255 tone levels, then C= 255−R, M=255−G, and Y=255−B. When the color image-forming machine is a color printer, the color image signal-forming means forms the above-mentioned digital signals Cd, Md and Yd based on the signals which are received from a computer or the like in relation to a number of pixels. The color image-forming machine is further equipped with a color image-forming means which applies a C-color material, an M-color material and a Y-color material based on the digital signals Cd, Md and Yd, respectively and further applies a BK-color material (BK means "black" in this specification) in order to save the C-color material, M-color material and Y-color material and/or to improve reproduceability of BK, and thus forms a color image. As the color material, there is usually used a toner or an ink.

As is known among people skilled in the art, the C-color material, M-color material and Y-color material used for forming a color-copied image do not have ideal spectral characteristics but contain so-called turbid components. Besides, the analog signals Ra, Ga and Ba formed by the color image reading means are not based ideal spectral characteristics and contain distortion ascribed to characteristics of the color image reading means. In view of such circumstances, Japanese Laid-Open Patent Publication (Kokai) No. 7855/1989 discloses a method according to which digital signals Cd, Md and Yd formed by a color image signal-forming means are corrected based upon a masking operation expression (A) mentioned below, and a color image is formed based upon the corrected digital signals Cd", Md" and Yd". In the following masking operation expression, a coefficient $a_{ij}$ (where i=1,2,3, j=1,2,3) can be set either experimentally or theoretically.

$$\begin{vmatrix} Cd" \\ Md" \\ Yd" \end{vmatrix} = \begin{vmatrix} a_{11} & a_{12} & a_{13} \\ a_{21} & a_{22} & a_{23} \\ a_{31} & a_{32} & a_{33} \end{vmatrix} \begin{vmatrix} Cd \\ Md \\ Yd \end{vmatrix} \quad (A)$$

Furthermore, Japanese Laid-Open Patent Publication (Kokai) No. 113126/1994 discloses a method of changing the coefficient $a_{ij}$ in the masking operation expression depending upon the tone levels of each of the digital signals Cd, Md and Yd in order to improve color reproduceability. More specifically, the publication discloses that the digital signals Cd, Md and Yd are corrected by using different masking operation expressions, i.e., by using masking operation expressions having different coefficients $a_{ij}$, depending upon which divided range, formed by dividing the whole gradation range into plural ranges (e.g. three ranges), the digital signals Cd, Md and Yd belong.

The present inventor has conducted diligent study and experimented repetitively concerning the method of correcting colors, disclosed in Japanese Laid-Open Patent Publication (Kokai) No. 113126/1994, but could not accomplish color reproduction which is sufficiently satisfactory in all color regions despite that the whole tone range was divided into a relatively large number of ranges. For example, when the coefficient $a_{ij}$ is so set that the color in the C-region, can be favorably reproduced, the color reproduceability becomes insufficient in other color regions.

SUMMARY OF THE INVENTION

The object of the present invention is to form a color image having excellent color reproduceability in all color regions by improving the manner of correcting colors, i.e., by improving the manner of correcting digital signals Cd, Md and Yd, in a color image-forming machine.

The present inventor has conducted arduous study and experiment and has discovered the fact that the above-mentioned object can be accomplished by discriminating to which one of a plurality of predetermined color regions each of a number of pixels belongs, selecting a different masking operation expression corresponding to each of the plurality of color regions, and correcting the digital signals Cd, Md and Yd.

In order to accomplish the above-mentioned object according to the present invention, there is provided a color image-forming machine comprising a color image signal-forming means for outputting digital signals Cd, Md and Yd expressing, on tone levels, each of the three primary colors C, M and Y for each of a number of pixels, and a masking means for correcting the digital signals Cd, Md and Yd in compliance with masking operation expressions, wherein provision is made of a color region discrimination means which discriminates, based on the digital signals Cd, Md and Yd, to which one of a plurality of predetermined color regions each of a number of pixels belongs, and wherein the masking means corrects the digital signals Cd, Md and Yd by selecting different masking operation expressions depending upon the plurality of color regions.

It is desired that the plurality of color regions are determined based on a relative ratio of the digital signals Cd, Md and Yd. It is desired that the plurality of color regions include a GR-(which means "grey" in this specification) region, a C-region, a B-region, a G-region, a Y-region, an M-region, an R-region and an S-(which means "skin color" in this specification) region.

In the color image-forming machine of the present invention, the digital signals Cd, Md and Yd are corrected in compliance with masking operation expressions having independently selected coefficients in the plurality of color regions, whereby the colors are reproduced to a satisfactory degree in the plurality of color regions.

DETAILED DESCRIPTION OF THE PREFERRED EMBODIMENTS

Figure 1:
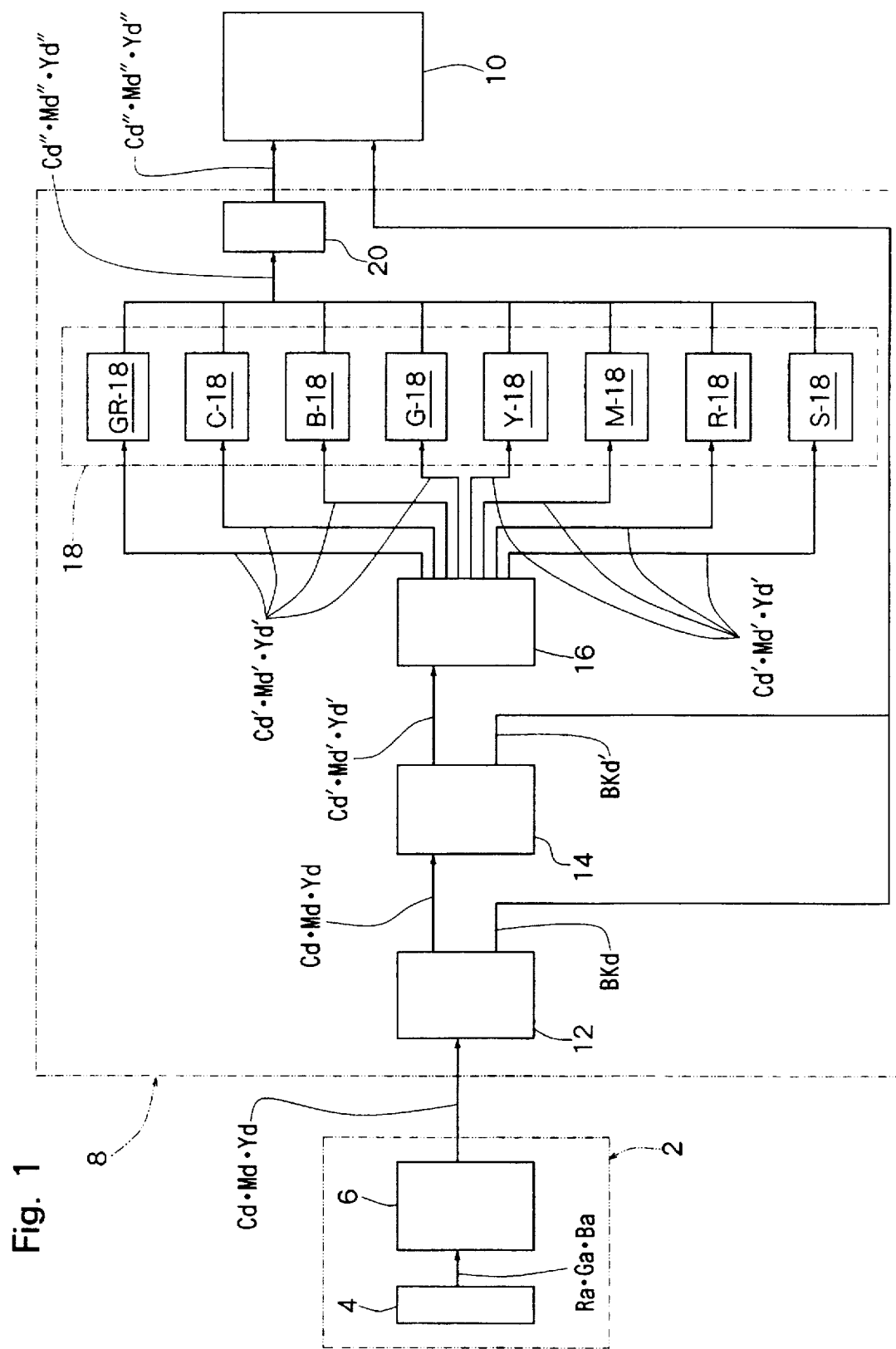
FIG. 1 is a block diagram schematically illustrating a manner of processing image signals in a color copying machine which is an embodiment of a color image-forming machine constituted according to the present invention.

A preferred embodiment of a color image-forming machine of the present invention will now be described in detail with reference to the accompanying drawing.

FIG. 1 is a block diagram schematically illustrating a manner of processing image signals in a color copying machine which is an embodiment of a color image-forming machine constituted according to the present invention. The diagramed color copying machine includes a color image signal-forming means 2 which is constituted by a color image reading means 4 and a conversion means 6. It is preferable that the color image reading means 4 has a number of CCDs (charge-coupled devices) arranged in the main scanning direction, the number of CCDs being each provided with any one of a B-filter, a G-filter and an R-filter. The color image reading means 4 is scan-moved relatively in a sub-scanning direction with respect to a color document which is irradiated with light, and decomposes the reflected light for each of a number of pixels on the color document into three primary colors R, G and B in the additive mixture process to form analog signals Ra, Ga and Ba. The conversion means 6 converts the analog signals Ra, Ga and Ba into digital signals Cd, Md and Yd to express, on tone levels, the three primary colors C, M and Y in the subtractive mixture process. The digital signals Cd, Md and Yd usually express the C, M and Y in 8-bit data on tone levels, i.e., on 0 to 255 tone levels. As is well known, the C, M and Y have complementary color relationships to the R, G and B, respectively. When expressed on 0 to 255 tone levels, therefore, there are built up relationships of C=255–R, M=255–G and Y=255–B. Based on such relationships, the conversion means 6 converts the above-mentioned analog signals Ra, Ga and Ba into the above-mentioned digital signals Cd, Md and Yd. During the conversion, furthermore, a shading correction (for correcting fluctuation in the lamps for illuminating a color document) and a logarithm correction (for correcting nonlinearity in the CCD output) that are well known among people skilled in the art are executed.

With further reference to FIG. 1, the digital signals Cd, Md and Yd output from the conversion means 6 are subjected to a signal processing which is generally designated at 8 and are fed to a color image-forming means 10. The color image-forming means 10 may be the one which forms an electrostatic latent image by selectively projecting laser beams onto a photosensitive material for each of C, M, Y and BK and develops the electrostatic latent image with C-toner, M-toner, Y-toner and BK-toner. In the signal processing 8, first, a black-forming processing 12 is executed. In the black-forming processing 12, black pixels are selected out of many pixels of the color image, and a digital signal BKd corresponding thereto is formed. The thus formed digital signal BKd is fed to a color image-forming means 8. In the black pixels, the digital signals Cd, Md and Yd are substantially the same and have tone levels larger than a predetermined value, and black pixels are selected based on this fact. Then, the digital signals Cd, Md and Yd related to pixels other than the black pixels are subjected to a background removal processing 14. In the background removal processing 14, minimum values min(Cd, Md, Yd) are picked up out of Cd, Md and Yd in the pixels, and values αmin(Cd, Md, Yd) obtained by multiplying the minimum values by a coefficient α are output as a BK component BKd'. The coefficient α may be, for example, about 0.5. The thus formed digital signal BKd' |=αmin(Cd, Md, Yd)| is fed to the color image-forming means 8. As is well known among people skilled in the art, removal of the background is executed in an attempt to substitute the use of the BK toner which is relatively cheap partly for the use of the C-toner, M-toner and Y-toner which are relatively expensive in the developing.

Next, in the color copying machine constituted according to the present invention, the digital signals Cd' (=Cd–BKd'), Md' (=Md–BKd') and Yd' (=Yd–BKd') subjected to the background removal processing, are then subjected to a color region discrimination processing 16 by a color region discrimination means. The color region discrimination processing 16 discriminates to which one among a plurality of color regions or, preferably, among eight color regions, i.e., among GR-region, C-region, B-region, G-region, Y-region, M-region, R-region and S-region the color of each of the pixels belongs, based on Cd', Md' and Yd' or, preferably, based on a relative ratio of Cd', Md' and Yd'. More specifically, in the preferred embodiment, the color region discrimination processing 16 is executed according to the following procedures.

(1) In a first step, it is discriminated whether the pixels belong to the GR-region or not. The discrimination is based on whether Cd', Md' and Yd' exist relatively uniformly or not. It is discriminated that the pixels belong to the GR-region when both of $$0.6<Md'/Yd'<1.3$$

$$0.6<Md'/Cd'<1.3$$

are satisfied, when both of $$0.6<Cd'/Yd'<1.3$$

$$0.6<Cd'/Md'<1.3$$

are satisfied, and when both of $$0.6<Yd'/Md'<1.3$$

$$0.6<Yd'/Cd'<1.3$$

are satisfied.

(2) In a second step, it is discriminated whether those pixels that were discriminated not to belong to the GR-region in the first step, belong to the C-region or not. This discrimination is based on whether Md' and Yd' are both lower than Cd' or not. It is discriminated that the pixels belong to the C-region when both of $$Md'/Cd'<0.6$$

$$Yd'/Cd'<0.6$$

are satisfied.

(3) In a third step, it is discriminated whether those pixels that were discriminated not to belong to the GR-region in the first step and were discriminated not to belong to the C-region in the second step, belong to the B-region or not.

This discrimination is based on whether Yd' is lower than Cd' and Md' or not. It is discriminated that the pixels belong to the B-region when both of $$Yd'/Md' < 0.5$$

$$Yd'/Cd' < 0.5$$

are satisfied.

(4) In a fourth step, it is discriminated whether those pixels that were discriminated not to belong to the GR-region in the first step, discriminated not to belong to the C-region in the second step and discriminated not to belong to the B-region in the third step, belong to the G-region or not. This discrimination is based on whether Md' is lower than Cd' and Yd' or not. It is discriminated that the pixels belong to the G-region when both of $$Md'/Cd' < 0.6$$

$$Md'/Yd' < 0.6$$

are satisfied.

(5) In a fifth step, it is discriminated whether those pixels that were discriminated not to belong to the GR-region in the first step, discriminated not to belong to the C-region in the second step, discriminated not to belong to the B-region in the third step and were discriminated not to belong to the G-region in the fourth step, belong to the Y-region or not. This discrimination is based on whether Md' is lower than Yd' and whether Cd' is smaller than a predetermined value or not. It is discriminated that the pixels belong to the Y-region when both of $$Md'/Yd' < 0.3$$

$$Cd'/255 < 0.1$$

are satisfied.

(6) In a sixth step, it is discriminated whether those pixels that were discriminated not to belong to the GR-region in the first step, discriminated not to belong to the C-region in the second step, discriminated not to belong to the B-region in the third step, discriminated not to belong to the G-region in the fourth step and discriminated not to belong to the Y-region in the fifth step, belong to the M-region or not. This discrimination is based on whether Cd' and Yd' are both lower than Md'. It is discriminated that the pixels belong to the M-region when both of $$Cd'/Md' < 0.3$$

$$Yd'/Md' < 0.55$$

are satisfied.

(7) In a seventh step, it is discriminated whether those pixels that were discriminated not to belong to the GR-region in the first step, discriminated not to belong to the C-region in the second step, discriminated not to belong to the B-region in the third step, discriminated not to belong to the G-region in the fourth step, discriminated not to belong to the Y-region in the fifth step and discriminated not to belong to the M-region in the sixth step, belong to the R-region or not. This discrimination is based on whether Cd' is lower than Md' and Yd. It is discriminated that the pixels belong to the R-region when both of $$Cd'/Md' < 0.3$$

$$Cd'/Yd' < 0.3$$

are satisfied.

(8) In an eighth step, it is discriminated whether those pixels that were discriminated not to belong to the GR-region in the first step, discriminated not to belong to the C-region in the second step, discriminated not to belong to the B-region in the third step, discriminated not to belong to the G-region in the fourth step, discriminated not to belong to the Y-region in the fifth step, discriminated not to belong to the M-region in the sixth step and discriminated not to belong to the R-region in the seventh step, belong to the S-region or not. It is discriminated that the pixels belong to the S-region when $$Cd'/255 + 0.1 < Md'/255$$

$$Md'/255 < Cd'/255 + 0.3$$

$$Md'/255 + 0.1 < Yd'/255$$

$$Yd'/255 < Md'/255 + 0.2$$

are satisfied.

Upon executing the above-mentioned first to eighth steps, it is discriminated to which one of eight color regions, i.e., to which one among the GR-region, C-region, B-region, G-region, Y-region, M-region, R-region and S-region each of the pixels belongs. The discrimination expressions in the above-mentioned first to seventh steps were suitably calculated based on Cd, Md and Yd data of each of the colors in a test chart No. 5-1 published by the Japanese Association of Electrophotography. The discrimination expression in the above-mentioned eighth step was experimentally obtained by the present inventor upon closely analyzing a variety of color images. According to experiments conducted by the present inventor, what is interesting is that colors of human faces in a natural color image belong in most cases to the above-mentioned S-region irrespective of white people, yellow people or black people. In the above-mentioned color region discrimination processing 16, the discrimination is executed based on the digital signals Cd', Md' and Yd' that have been subjected to the background removal processing 14. As desired, however, the discrimination may be executed based on the digital signals Cd, Md and Yd prior to being subjected to the background removal processing 14. The discrimination expression in this case may be the same as those mentioned above. According to experiments conducted by the present inventor, the results of discrimination based on the digital signals Cd', Md' and Yd' were almost the same as the results of discrimination based on the digital signals Cd, Md and Yd.

With further reference to FIG. 1, a masking processing 18 is executed by a masking means after the color region discrimination processing 16. The masking processing 18 corrects the digital signals Cd', Md' and Yd' from which the background has been removed based, on the following masking operation expression (B). Here, however, a combination of the coefficients $a_{ij}$ (i=1,2,3,j=1,2,3) in the following masking operation expression (B) are different from each other and hence, different masking operation expressions are selected to form corrected digital signals Cd', Md' and Yd', depending upon the above-mentioned eight color regions, i.e., depending upon the GR-region, C-region, B-region, G-region, Y-region, M-region, R-region and S-region and depending upon which one of divided ranges obtained by dividing the whole tone range into plural ranges each of the digital signals Cd', Md' and Yd' belongs.

$$\begin{vmatrix} Cd'' \\ Md'' \\ Yd'' \end{vmatrix} = \begin{vmatrix} a_{11} & a_{12} & a_{13} \\ a_{21} & a_{22} & a_{23} \\ a_{31} & a_{32} & a_{33} \end{vmatrix} \begin{vmatrix} Cd' \\ Md' \\ Yd' \end{vmatrix} \quad \text{(B)}$$

When the pixels belong to the GR-region, Cd', Md' and Yd' are well-balanced. Therefore, the masking processing GR-18 is executed to effect the correction without breaking the balance (use of a masking operation expression in other color region tends to break the balance). Table 1 shows preferred coefficients $a_{ij}$ in the masking operation expression (B).

TABLE 1

|  | Tone range | $a_{i1}$ | $a_{i2}$ | $a_{i3}$ |
|---|---|---|---|---|
| Cd'($a_{1j}$) | 0–55 | 0.52 | 0.0 | 0.0 |
|  | 56–110 | 0.65 | 0.0 | 0.0 |
|  | 111–190 | 0.76 | 0.0 | 0.0 |
|  | 191–255 | 0.85 | 0.0 | 0.0 |
| Md'($a_{2j}$) | 0–55 | 0.0 | 0.6 | 0.0 |
|  | 56–110 | 0.0 | 0.72 | 0.0 |
|  | 111–190 | 0.0 | 0.79 | 0.0 |
|  | 191–255 | 0.0 | 0.85 | 0.0 |
| Yd'($a_{3j}$) | 0–55 | 0.0 | 0.0 | 0.2 |
|  | 56–110 | 0.0 | 0.0 | 0.69 |
|  | 111–190 | 0.0 | 0.0 | 0.69 |
|  | 191–255 | 0.0 | 0.0 | 0.8 |

When, for example, (Cd', Md', Yd') is (115, 108, 114), the masking operation expression is selected as the following expression (C).

$$\begin{vmatrix} Cd'' \\ Md'' \\ Yd'' \end{vmatrix} = \begin{vmatrix} 0.76 & 0.0 & 0.0 \\ 0.0 & 0.72 & 0.0 \\ 0.0 & 0.0 & 0.69 \end{vmatrix} \begin{vmatrix} Cd' \\ Md' \\ Yd' \end{vmatrix} \quad \text{(C)}$$

When the pixels belong to the C-region, the Y-component is too small and the M-component is too large. Therefore, the masking processing C-18 is so executed as to increase Yd' and to decrease Md'. Preferred coefficients $a_{ij}$ in the above masking operation expression (B) are as shown in Table 2 below.

TABLE 2

|  | Tone range | $a_{i1}$ | $a_{i2}$ | $a_{i3}$ |
|---|---|---|---|---|
| Cd'($a_{1j}$) | 0–55 | 0.45 | 0.1 | –0.04 |
|  | 56–110 | 0.55 | –0.02 | –0.1 |
|  | 111–190 | 0.73 | –0.09 | –0.09 |
|  | 191–255 | 0.87 | –0.12 | –0.09 |
| Md'($a_{2j}$) | 0–55 | –0.3 | 0.1 | 0.0 |
|  | 56–110 | –0.3 | 0.1 | 0.0 |
|  | 111–190 | –0.3 | 0.1 | 0.0 |
|  | 191–255 | 0.0 | 0.47 | 0.15 |
| Yd'($a_{3j}$) | 0–55 | 0.1 | 0.03 | 0.42 |
|  | 56–110 | 0.1 | 0.02 | 0.6 |
|  | 111–190 | 0.1 | 0.0 | 0.7 |
|  | 191–255 | 0.1 | 0.0 | 0.76 |

When the pixels belong to the B-region, the Y-component is too large. Therefore, the masking processing B-18 is so executed as to decrease Yd'. Preferred coefficients $a_{ij}$ in the above masking operation expression (B) are as shown in Table 3 below.

TABLE 3

|  | Tone range | $a_{i1}$ | $a_{i2}$ | $a_{i3}$ |
|---|---|---|---|---|
| Cd'($a_{1j}$) | 0–55 | 0.45 | 0.1 | –0.04 |
|  | 56–110 | 0.55 | –0.02 | –0.1 |
|  | 111–190 | 0.8 | –0.09 | –0.09 |
|  | 191–255 | 0.87 | –0.12 | –0.09 |
| Md'($a_{2j}$) | 0–55 | –0.15 | 0.63 | 0.03 |
|  | 56–110 | –0.17 | 0.57 | 0.1 |
|  | 111–190 | –0.08 | 0.7 | 0.1 |
|  | 191–255 | 0.0 | 0.77 | 0.15 |
| Yd'($a_{3j}$) | 0–55 | –0.4 | –0.4 | 0.1 |
|  | 56–110 | –0.4 | –0.4 | 0.08 |
|  | 111–190 | –0.3 | –0.3 | 0.08 |
|  | 191–255 | –0.1 | 0.17 | 0.2 |

When the pixels belong to the G-region, the M-component is too small. Therefore, the masking processing G-18 is so executed as to increase Md'. Preferred coefficients $a_{ij}$ in the above masking operation expression (B) are as shown in Table 4 below.

TABLE 4

|  | Tone range | $a_{i1}$ | $a_{i2}$ | $a_{i3}$ |
|---|---|---|---|---|
| Cd'($a_{1j}$) | 0–55 | 0.45 | 0.1 | –0.04 |
|  | 56–110 | 0.55 | –0.02 | –0.1 |
|  | 111–190 | 0.73 | –0.09 | –0.09 |
|  | 191–255 | 0.87 | –0.12 | –0.09 |
| Md'($a_{2j}$) | 0–55 | –0.15 | 0.63 | 0.03 |
|  | 56–110 | –0.17 | 0.57 | 0.1 |
|  | 111–190 | –0.08 | 0.7 | 0.1 |
|  | 191–255 | 0.0 | 0.77 | 0.15 |
| Yd'($a_{3j}$) | 0–55 | –0.4 | –0.4 | 0.1 |
|  | 56–110 | –0.4 | –0.4 | 0.08 |
|  | 111–190 | –0.3 | –0.3 | 0.08 |
|  | 191–255 | –0.1 | 0.17 | 0.2 |

When the pixels belong to the Y-region, the M-component is too small. Therefore, the masking processing Y-18 is so executed as to increase Md'. Preferred coefficients $a_{ij}$ in the above masking operation expression (B) are as shown in Table 5 below.

TABLE 5

|  | Tone range | $a_{i1}$ | $a_{i2}$ | $a_{i3}$ |
|---|---|---|---|---|
| Cd'($a_{1j}$) | 0–55 | 0.45 | 0.1 | –0.04 |
|  | 56–110 | 0.45 | –0.02 | –0.1 |
|  | 111–190 | 0.63 | –0.09 | –0.09 |
|  | 191–255 | 0.87 | –0.12 | –0.09 |
| Md'($a_{2j}$) | 0–55 | 0.0 | 0.8 | 0.1 |
|  | 56–110 | 0.0 | 0.77 | 0.1 |
|  | 111–190 | 0.0 | 0.77 | 0.1 |
|  | 191–255 | 0.0 | 0.77 | 0.15 |
| Yd'($a_{3j}$) | 0–55 | 0.0 | 0.03 | 0.4 |
|  | 56–110 | –0.01 | –0.12 | 0.44 |
|  | 111–190 | 0.0 | –0.17 | 0.8 |
|  | 191–255 | 0.1 | –0.17 | 0.96 |

When the pixels belong to the M-region, the C-component is excessive to some extent. Therefore, the masking processing M-18 is so executed as to decrease Cd' to some extent. Preferred coefficients $a_{ij}$ in the masking operation expression (B) are as shown in Table 6 below.

TABLE 6

|  | Tone range | $a_{i1}$ | $a_{i2}$ | $a_{i3}$ |
| --- | --- | --- | --- | --- |
| Cd'($a_{1j}$) | 0–55 | 0.45 | 0.0 | −0.04 |
|  | 56–110 | 0.5 | −0.02 | −0.1 |
|  | 111–190 | 0.73 | −0.09 | −0.09 |
|  | 191–255 | 0.87 | −0.12 | −0.09 |
| Md'($a_{2j}$) | 0–55 | −0.2 | 0.63 | 0.03 |
|  | 56–110 | −0.2 | 0.71 | 0.1 |
|  | 111–190 | −0.2 | 0.73 | 0.1 |
|  | 191–255 | 0.0 | 0.73 | 0.15 |
| Yd'($a_{3j}$) | 0–55 | 0.0 | 0.15 | 0.25 |
|  | 56–110 | −0.01 | 0.22 | 0.3 |
|  | 111–190 | 0.0 | 0.22 | 0.6 |
|  | 191–255 | 0.0 | −0.17 | 0.8 |

When the pixels belong to the R-region, the C-component is excessive to some extent. Therefore, the masking processing R-18 is so executed as to decrease Cd' to some extent. Preferred coefficients $a_{ij}$ in the masking operation expression (B) are as shown in Table 7 below.

TABLE 7

|  | Tone range | $a_{i1}$ | $a_{i2}$ | $a_{i3}$ |
| --- | --- | --- | --- | --- |
| Cd'($a_{1j}$) | 0–55 | 0.35 | 0.0 | −0.04 |
|  | 56–110 | 0.45 | −0.02 | −0.1 |
|  | 111–190 | 0.63 | −0.09 | −0.09 |
|  | 191–255 | 0.77 | −0.12 | −0.09 |
| Md'($a_{2j}$) | 0–55 | 0.15 | 0.6 | 0.03 |
|  | 56–110 | −0.01 | 0.57 | 0.13 |
|  | 111–190 | −0.08 | 0.62 | 0.15 |
|  | 191–255 | 0.0 | 0.77 | 0.15 |
| Yd'($a_{3j}$) | 0–55 | 0.0 | 0.03 | 0.4 |
|  | 56–110 | −0.01 | 0.0 | 0.42 |
|  | 111–190 | 0.0 | 0.0 | 0.7 |
|  | 191–255 | 0.0 | 0.0 | 0.8 |

When the pixels belong to the S-region, the M-component is excessive (face becomes reddish). Therefore, the masking processing S-18 is so executed as to decrease Md'. Preferred coefficients $a_{ij}$ in the masking operation expression (B) are as shown in Table 8 below.

TABLE 8

|  | Tone range | $a_{i1}$ | $a_{i2}$ | $a_{i3}$ |
| --- | --- | --- | --- | --- |
| Cd'($a_{1j}$) | 0–100 | 0.13 | 0.1 | −0.04 |
|  | 101–150 | 0.20 | −0.02 | −0.10 |
|  | 151–190 | 0.25 | −0.09 | −0.09 |
|  | 191–255 | 0.30 | −0.12 | −0.09 |
| Md'($a_{2j}$) | 0–100 | −0.15 | 0.33 | 0.03 |
|  | 101–150 | −0.17 | 0.33 | 0.10 |
|  | 151–190 | −0.08 | 0.33 | 0.10 |
|  | 191–255 | 0.0 | 0.59 | 0.15 |
| Yd'($a_{3j}$) | 0–100 | 0.0 | 0.03 | 0.90 |
|  | 101–150 | −0.01 | −0.12 | 0.90 |
|  | 151–190 | −0.01 | −0.12 | 0.90 |
|  | 191–255 | 0.1 | −0.17 | 0.96 |

The correction by the above-mentioned masking operation expression (B) can be favorably carried out by, for example, preparing a number of correction tables storing the results of operation based on the masking operation expression (B) and by using such correction tables. Details of the manner of correction by using the correction tables are described in Japanese Laid-Open Patent Publication (Kokai) No. 113126/1994 mentioned earlier, and are not described in this specification. As desired, the correction can be executed by actually performing the arithmetic operation based on the masking operation expression (B). In the above-mentioned examples, the coefficient $a_{ij}$ of the masking operation expression (B) is changed depending upon which one of the divided ranges obtained by dividing the whole tone range (0 to 255 tone levels) into four ranges (0 to 55, 56 to 110, 111 to 190, and 191 to 255 ranges in the GR-region, C-region, B-region, G-region, Y-region, M-region and R-region, and 0 to 100, 101 to 150, 151 to 190, and 191 to 255 ranges in the S-region) each of the Cd', Md' and Yd' belongs. As required, however, the whole tone range may be divided into two, three, five or more ranges, and the coefficient $a_{ij}$ of the masking operation formula (B) may be changed depending upon to which range each of them belongs. Or, the coefficient $a_{ij}$ of the masking operation formula (B) may be used in common for all of the tone range.

In the preferred embodiment shown in FIG. 1, the digital signals Cd', Md' and Yd' that are corrected as described above are further subjected to a singular relation correction processing 20. In the above-mentioned masking processing 18, the coefficient $a_{ij}$ of the masking operation formula (B) is changed depending upon divided ranges obtained by dividing the whole tone range into four ranges for each of the digital signals Cd', Md' and Yd'. At the boundary regions among the divided ranges, therefore, there often occurs a singular relationship, such as inversion in the increase or decrease or sharp gap in the increase or decrease, between the digital signals Cd', Md' and Yd' before correction and the digital signals Cd', Md' and Yd' after correction. When such a singular relation is not corrected, a sudden change in the concentration may occur in a portion where the concentration should change mildly in the color picture and as a result, a so-called false contour may be formed. The singular relation correction processing 20 suitably corrects the singular relationship. Details of such a correction is disclosed in the aforementioned Japanese Laid-Open Patent Publication (Kokai) No. 113126/1994 and are not described in this specification. The digital signals Cd', Md' and Yd' which, as required, are subjected to the singular relation correction through the singular relation correction processing 20, are sent to the color image-forming means 10.

With reference to FIG. 1, the color image-forming means 10 forms a color image based on the digital signal BKd fed after the black-forming processing 12, based on the digital signal BKd' fed after the background removal processing 14, and based on the digital signals Cd', Md' and Yd' fed after the singular relation correction processing 20. As required, in this case, signal processings are executed for changing the magnification, for adjusting the density, etc. that are known among people skilled in the art. Thus, there can be obtained a color copy having a color image excellent in color reproduceability in all color regions for the color document.

In the foregoing was described in detail a preferred embodiment of the color image-forming machine constituted according to the present invention with reference to the accompanying drawings. It should, however, be noted that the invention is in no way limited to the above-mentioned embodiment only but can be changed or modified in a variety of ways without departing from the scope of the invention.

What we claim is:

1. A color image-forming comprising:
   a color image signal-forming means for outputting digital signals Cd, Md, and Yd expressing, on tone levels, three primary colors C, M, and Y for a number of pixels,
   a masking means for correcting said digital signals Cd, Md, and Yd in compliance with masking operation expressions; and a color region discrimination means which discriminates, based on said digital signals Cd, Md, and Yd, to which one of a plurality of predetermined color regions said each of a number of pixels belongs; and wherein said masking means corrects said digital signals Cd, Md, and Yd by selecting different masking operation expressions depending upon said Plurality of color regions, and said plurality of color regions are determined based on a relative ratio of said digital signals Cd, Md, and Yd.

2. A color image-forming machine comprising:

a color image signal-forming means for outputting digital signals Cd, Md, and Yd expressing, on tone levels, three primary colors C, M, and Y for a number of pixels, a masking means for correcting said digital signals Cd, Md, and Yd in compliance with masking operation expressions; and a color region discrimination means which discriminates, based on said digital signals Cd, Md, and Yd, to which one of a plurality of predetermined color regions said each of a number of pixels belongs; and wherein said masking means corrects said digital signals Cd, Md, and Yd by selecting different masking operation expressions depending upon said plurality of color regions, and said plurality of color regions include a GR-region, a C-region, a B-region, a G-region, a Y-region, an M-region, an R-region and an S-region.

3. A color image-forming machine comprising:

a color image signal-forming means for outputting digital signals Cd, Md, and Yd expressing, on tone levels, three primary colors C, M, and Y for a number of pixels, a masking means for correcting said digital signals Cd, Md, and Yd in compliance with masking operation expressions; and a color region discrimination means which discriminates, based on said digital signals Cd, Md, and Yd, to which one of a plurality of predetermined color regions said each of a number of pixels belongs; and wherein said masking means corrects said digital signals Cd, Md, and Yd by selecting different masking operation expressions depending upon said plurality of color regions, and said masking means selects different masking operation expressions depending upon which one of divided ranges obtained by dividing the whole tone range into plural ranges each of the digital signals Cd, Md, and Yd belongs in each of said plurality of color regions.

* * * * *